(12) United States Patent
Van Amerongen et al.

(10) Patent No.: US 11,193,823 B2
(45) Date of Patent: Dec. 7, 2021

(54) MULTI-ANGLE IMAGER

(71) Applicants: Stichting Nederlandse Wetenschappelijk Onderzoek Instituten, Utrecht (NL); Airbus Defence and Space Netherlands B.V., Leiden (NL)

(72) Inventors: Aaldert Hidde Van Amerongen, Utrecht (NL); Ersin Dogan, Utrecht (NL); Jeroen Henricus Hubertus Rietjens, Utrecht (NL)

(73) Assignees: Stichting Nederlandse Wetenschappelijk Onderzoek Instituten, Utrecht (NL); Airbus Defence and Space Netherlands B.V., Leiden (NL)

( * ) Notice: Subject to any disclaimer, the term of this patent is extended or adjusted under 35 U.S.C. 154(b) by 0 days.

(21) Appl. No.: 16/644,077

(22) PCT Filed: Sep. 3, 2018

(86) PCT No.: PCT/NL2018/050566
§ 371 (c)(1),
(2) Date: Mar. 3, 2020

(87) PCT Pub. No.: WO2019/045569
PCT Pub. Date: Mar. 7, 2019

(65) Prior Publication Data
US 2020/0319026 A1    Oct. 8, 2020

(30) Foreign Application Priority Data
Sep. 4, 2017 (NL) .................................... 2019478

(51) Int. Cl.
*G01J 3/18* (2006.01)
*G01J 3/28* (2006.01)
(Continued)

(52) U.S. Cl.
CPC ............. *G01J 3/2823* (2013.01); *G01J 3/021* (2013.01); *G01J 3/0208* (2013.01);
(Continued)

(58) Field of Classification Search
CPC ........ G01J 3/2823; G01J 3/021; G01J 3/0224; G01J 2003/2826
See application file for complete search history.

(56) References Cited

U.S. PATENT DOCUMENTS 3,900,262 A * 8/1975 Baxter ...................... G01P 3/36
356/28
4,900,914 A    2/1990 Raff et al.
(Continued)

FOREIGN PATENT DOCUMENTS

| EP | 1925965 A1 | 5/2008 |
|---|---|---|
| WO | 03067305 A1 | 8/2003 |
| WO | 2007095743 A1 | 8/2007 |

OTHER PUBLICATIONS

Lee, David, Barlow, "PERSIST: prototype Earth observing system using image slicer mirrors", SPIE Remote Sensing, 2012 (Year: 2012).*

(Continued)

*Primary Examiner* — Maurice C Smith
(74) *Attorney, Agent, or Firm* — Banner & Witcoff, Ltd.

(57) ABSTRACT

A multi-angle imager (10) comprises an imaging array (Mij) configured to receive light beams (Li) via one or more entrance pupils (A1) according to distinct fields of view (Vi) of an object (P0) along each of multiple entry angles (αi). The imaging array (Mij) comprises multiple imaging branches (M1j, M2j) configured to form respective optical paths for the light beams (L1, L2) through the imager (10) for imaging respective subsections (S1, S2) of the object (P0). Each imaging branch (M1j) comprises a distinct set of optical elements (M11, M21) configured to receive the
(Continued)

respective light beam (L1) along the respective entry angle (α1) and redirect the respective light beam (L1) towards the imaging plane (P1). The light beams (L1, L2) from each of the multiple imaging branches (M1j, M2j) are redirected to travel in a common direction (y) between the imaging array (Mij) and the imaging plane (P1).

20 Claims, 4 Drawing Sheets

(51) Int. Cl.
    *G01J 3/02*    (2006.01)
    *G01J 3/447*   (2006.01)
    *G02B 5/10*    (2006.01)

(52) U.S. Cl.
    CPC ........... *G01J 3/0224* (2013.01); *G01J 3/0289* (2013.01); *G01J 3/18* (2013.01); *G01J 3/2803* (2013.01); *G01J 3/447* (2013.01); *G02B 5/10* (2013.01)

(56) References Cited

U.S. PATENT DOCUMENTS

| | | | |
|---|---|---|---|
| 4,958,893 A * | 9/1990 | Noguchi | B23K 26/06 |
| | | | 348/E3.009 |
| 2005/0036198 A1 | 2/2005 | Safa | |
| 2012/0105593 A1 | 5/2012 | Berestov et al. | |
| 2014/0132804 A1 | 5/2014 | Guissin et al. | |

OTHER PUBLICATIONS

A. Calcines, "The Multi-Slit Image Slicer for the Est Spectrograph", May 9, 2013 (Year: 2013).*

Florence Laurent, "Collimating Slicer for Optical Integral Field Spectroscopy", 2016 (Year: 2016).*

Dec. 21, 2018—International Search Report and Written Opinion, PCT/NL2018/050566.

* cited by examiner

MULTI-ANGLE IMAGER

CROSS-REFERENCE TO RELATED APPLICATIONS

This application is a U.S. National Stage application under 35 U.S.C. § 371 of International Application PCT/NL2018/050566 (published as WO 2019/045569 A1), filed Sep. 3, 2018, which claims the benefit of priority to Application NL 2019478, filed Sep. 4, 2017. Benefit of the filing date of these prior applications is hereby claimed. Each of these prior applications is hereby incorporated by reference in its entirety.

TECHNICAL FIELD AND BACKGROUND

The present disclosure relates to a multi-angle imager and a method to simultaneously image different subsections of an object, e.g. planetary surface at different angles.

For example, in an article titled "SPEX: The Spectropolarimeter For Planetary Exploration" (International Conference on Space Optics 2010), Rietjens et al describe a multi-angle spectropolarimeter designed to operate from an orbiting or in situ platform. Its purpose is to simultaneously measure the radiance and the state (degree and angle) of linear polarization of sunlight that has been scattered in a planetary atmosphere and/or reflected by the planetary surface. Light is received from multiple angles corresponding to respective swaths of the planetary surface to be imaged. As explained, the degree of linear polarization is sensitive to the microphysical properties of atmospheric or surface particles (such as size, shape, and composition), and to the vertical distribution of atmospheric particles, such as cloud top altitudes. Such measurements can thus be used for disentangling many parameters that describe planetary atmospheres and surfaces. SPEX uses a passive method for its radiance and polarization observations that is based on a carefully selected combination of polarization optics. This method, called spectral modulation, is the modulation of the radiance spectrum in both amplitude and phase by the degree and angle of linear polarization, respectively. The polarization optics consists of an achromatic quarter-wave retarder, an athermal multiple-order retarder, and a polarizing beam splitter. In the design, it is shown that each branch of optics is provided with its own polarization optics placed behind respective apertures.

There is a need to further improve the design of multi-angled imagers e.g. with regards to compactness, robustness and weight reduction.

SUMMARY

Aspects of the present disclosure relate to multi-angle imagers and methods to simultaneously image different subsections of an object. The imager typically comprises one or more entrance pupils configured to pass through light beams of an object to be imaged from multiple entry angles into the imager. The imaging array may be configured to receive the light beams via the one or more entrance pupils according to distinct fields of view of the object along each of the multiple entry angles. The imaging array may further be configured to image subsections of the object according to the distinct fields of view onto an imaging plane. As described herein the imaging array comprises multiple imaging branches configured to form respective optical paths for the light beams through the imager for imaging the respective subsections of the object.

By providing each imaging branch with a distinct set of optical elements to receive and redirect the respective light beams, complicated freeform optical surfaces can be avoided and weight of unused intermediate surfaces can be omitted. By redirecting the light beams from each of the multiple imaging branches to travel in a common direction, further elements such polarization optics can be integrated to act on all beams simultaneously, instead of using separate optics for each of the beams This can further reduce weight. By having the redirected light beams travel along substantially parallel paths in the common direction, the optical effects on each of the beams can be more homogeneous and the design less complicated. By combining the incoming light beams to have a common effective focal plane, e.g. at an imaging sensor or slit, the multiple beams can be effectively treated as a single extended beam improving robustness and further reducing complexity. By stacking the light beams from each of the multiple imaging branches, the multiple beams can form a combined image particularly suitable for the entrance slit of a spectrometer. For example, multiple sections can be spectrally dissolved using a single spectrometer to reduce weight. By imaging distinct fields of view, separated by non-imaged sections there between, it can be prevented that light of one section mixes in the image of another section, even without slicing the field in an intermediate image plane. In this way an additional optical "image slicer" system placed after the telescope can be omitted and additional weight and complexity avoided. An image slicer system is a re-imager that includes an optical element placed in an intermediate image that slices the field.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
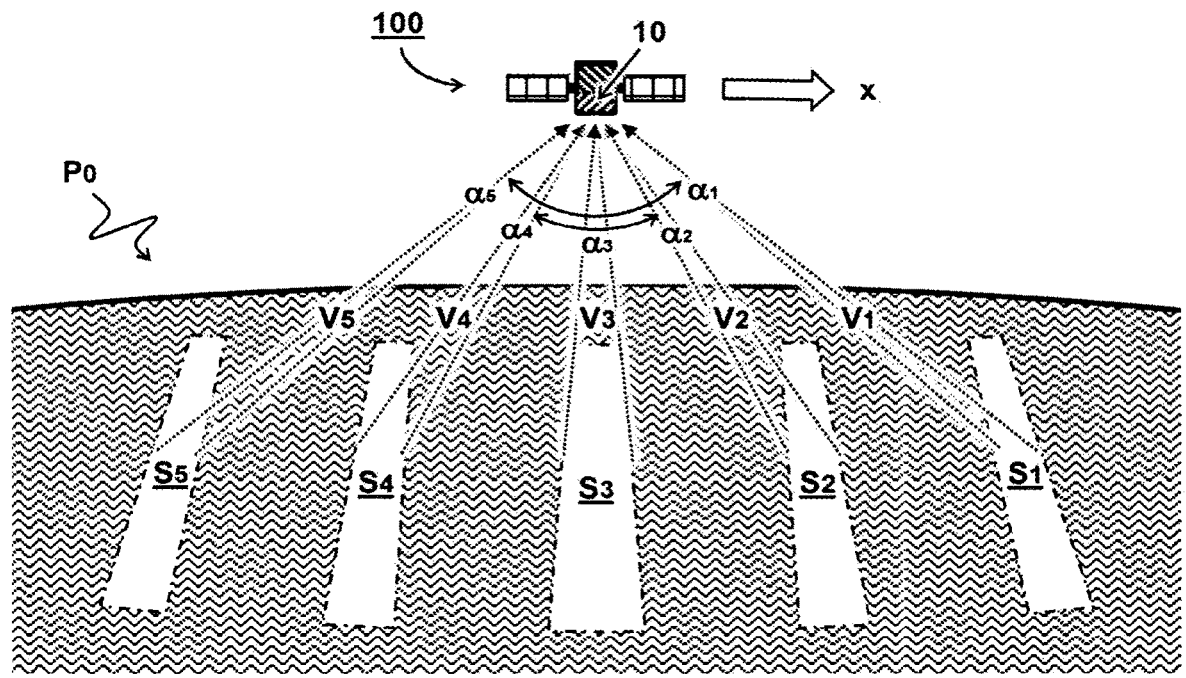
FIG. 1A schematically illustrates a satellite comprising an imager as described herein.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
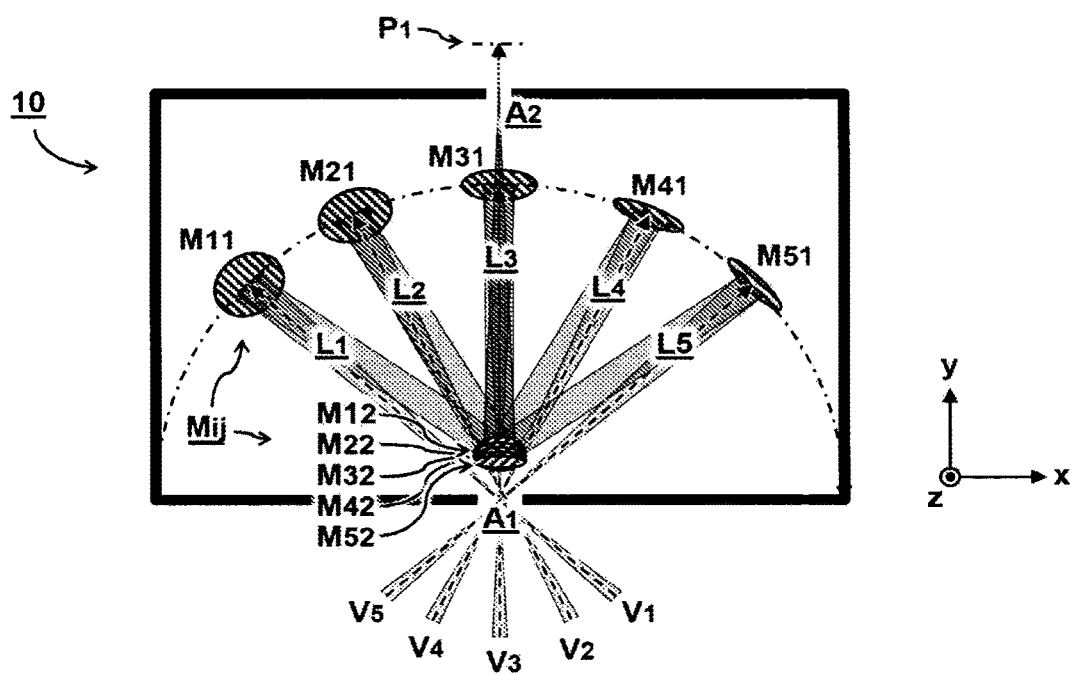
FIG. 1B schematically illustrates a top view of an embodiment for a multi-angle imager.
Figure 2A:
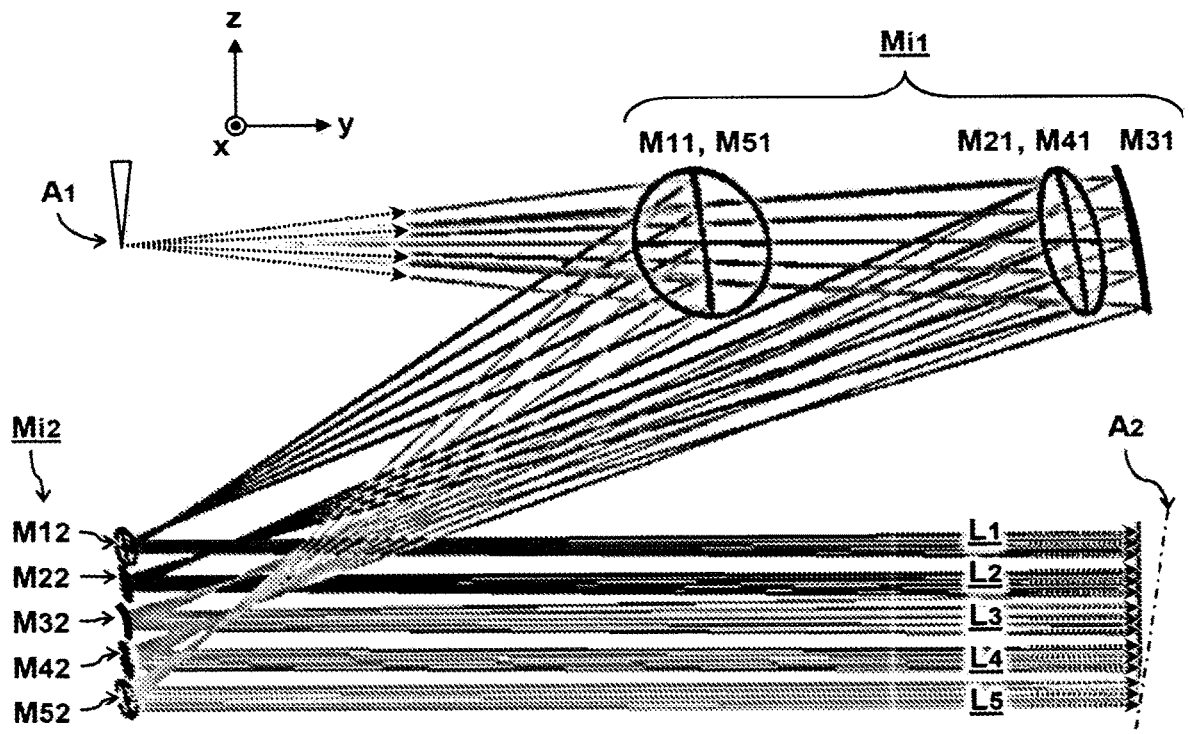
FIG. 2A schematically illustrates a side view of the embodiment.
Figure 2B:
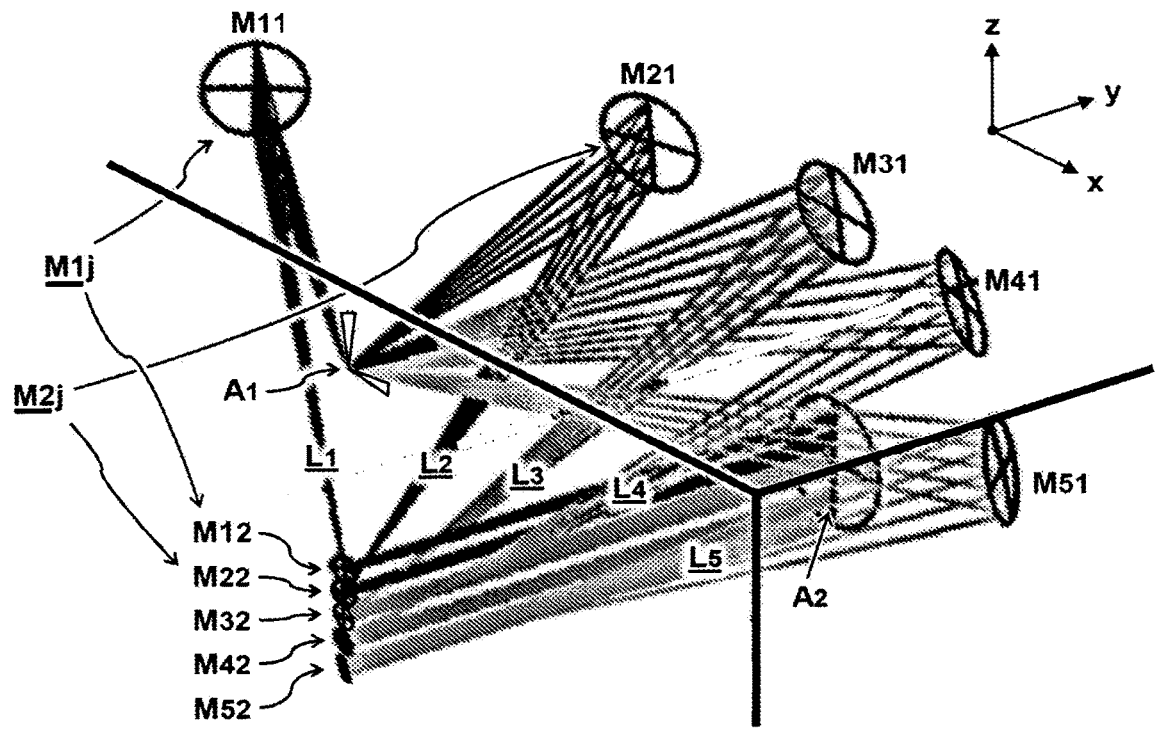
FIG. 2B schematically illustrates a perspective view of the embodiment.

FIG. 1A schematically illustrates a satellite 100 comprising an imager 10. FIG. 1B schematically illustrates a top view of an embodiment for a multi-angle imager 10. FIG. 2A schematically illustrates a side view of the embodiment. FIG. 2B schematically illustrates a perspective view of the embodiment.

In the embodiment shown, the multi-angle imager 10 comprises at least one entrance pupil A1 configured to pass through light beams Li of an object P0 to be imaged from multiple entry angles $\alpha i$ into the imager 10.

In other embodiment (not shown), the imager may comprise multiple entrance pupils, e.g. one for each imaging branch. For example, multi aperture can be used instead of single aperture to minimize angle of incidence on Mi1 and Mi2 mirrors. Generally, the entrance pupil can be described as the optical image of the physical aperture stop, as 'seen' through the front of the imaging system. It is typically, located at the vertex of the imager's angle of view.

In some embodiments, an imaging array Mij is configured to receive the light beams Li via the one or more entrance pupils A1, e.g. according to distinct fields of view Vi of the object P0 along each of the multiple entry angles $\alpha i$. In other or further embodiments, the imaging array Mij is configured to image subsections Si of the object P according to the distinct fields of view Vi onto an imaging plane P1. For example, the imaging plane P1 can be at the surface of a detector (not shown here). Alternatively, or in addition, an (intermediate) imaging plane can e.g. be at a slit (not shown here).

In some embodiments, the imaging array Mij comprises multiple imaging branches, e.g. indicated in FIG. 2B by the references M1j, M2j. The imaging branches are configured to form respective optical paths for the light beams through the imager 10 for imaging the respective subsections of the object P0. Preferably, each imaging branch comprises a distinct set of optical elements, e.g. the mirrors M11, M12 for imaging branch M1j. The optical elements in each imaging branch are configured to receive the respective light beam along the respective entry angle $\alpha 1$ and/or redirect the respective light beam towards the imaging plane P1 (or intermediate imaging plane).

In a preferred embodiment, e.g. as shown in FIG. 2A, the light beams L1, L2 from each of the multiple imaging branches M1j, M2j are redirected to travel in a common direction "y" between the imaging array Mij and the imaging plane P1. More preferably, the redirected light beams travel along substantially parallel paths in the common direction "y". For example, the paths are parallel to within ten degrees plane angle, or less, e.g. within five degrees, or even within one degree, or less than a tenth of a degree. In other or further preferred embodiments, the imaging array Mij is configured to combine the incoming light beams Li to have a common effective focal plane, e.g. at an imaging sensor or slit (not shown here). For example, the imaging branches M1j, M2j may have optical elements each having different curvatures but the branches preferably have a focal length optimized to achieve a common size on the detector for each Si. For imaging sections of e.g. a planet under various angles, the imaging branch for each angle may have its own distinct focal length in order to achieve common magnification of each strip on the detector By providing the light beams with a common direction and common effective focal plane or collimation, the plurality of beams can be effectively treated as a single extended beam. This has the advantage that further optical elements in an optical path after the imaging array Mij can be combined or integrated. For example, a single polarization modulation optics (not shown here) can be used to modulate the multiple beams, a single grating (not shown here) can be used to spectrally dissolve the multiple beams, one mirror or lens (not shown here) can be used to collimate or focus the multiple beams, single spectral filter, single 50/50 splitter, single beam splitter or single Philips-prism, et cetera. It will be appreciated that this combination or integration of optical elements can save weight and/or improve robustness and/or manufacturability.

In some embodiments, e.g. as shown in FIGS. 2A and 2B, the light beams L1, L2 from each of the multiple imaging branches M1j, M2j are stacked in a line or row along a direction "z" transverse to their direction of travel "y". Preferably, the multiple imaging branches M1j, M2j are configured to stack their respective light beams one above the other along a direction "z" transverse to a plane (x, y) spanned by the multiple entry angles $\alpha i$.

In some embodiments, each imaging branch Mij has its own set of at least two optical elements M11, M12. For example, the optical elements are distinct from any other imaging branch M2j. In a preferred embodiment, each imaging branch M1j, M2j has a distinct primary mirror M11, M21. Preferably, the primary mirrors Mi1 are distributed to receive the light beams Li from the one or more entrance pupils A1 at a range of multiple entry angles $\alpha i$. Typically, the primary mirrors Mi1 have a concave reflecting surface to at least partially focus the reflected beams. In another or further preferred embodiment, each imaging branch M1j, M2j has a distinct secondary mirror M12, M22. Preferably, the secondary mirrors Mi2 are stacked in a row to receive the light beams Li reflected from the primary mirrors Mi1 and reflect parallel light beams in a common direction. In some embodiments, the secondary mirrors Mi2 have a concave reflecting surface e.g. to at least partially collimate or focus the reflected beams. Alternatively, the secondary mirrors Mi2 can be convex in some designs, e.g. with three mirrors per imaging branch.

Preferably, the directions of the primary, secondary, and optionally further mirrors of each of the imaging branches are distinctly oriented to provide a common direction of the light beams exiting the imaging array Mij. Preferably, the primary, secondary, and optionally further mirrors of each of the imaging branches are distinctly curved to provide a common focal length between the imaging branches. For example, the corresponding mirrors for different imaging branches can have different radii of curvature but as a set provide the same effective focal length. In some embodiments, a common focal length can be achieved by adjusting mirror separation of the mirrors and/or their radius of curvature. In some embodiments off-axis mirrors are used; alternatively, or in addition, also on-axis mirrors may be used. In some embodiments, the mirror surfaces can be described by a biconic design. The biconic design can e.g. be arranged to provide a desired anamorphic ratio. In some embodiments it is preferred to have a telecentric image space. To achieve this, a pupil stop can be positioned at any (intermediate) focal point of the telescope system.

The optical elements adjacent imaging branches M1$j$, M2$j$ are preferably distinct. For example, corresponding optical elements of different imaging branches M1$j$, M2$j$ are separate from each other, e.g. spaced apart. Typically each optical surface provides a distinct optical function. For example, each optical surface has its own geometric definition. In some cases, the optical elements may be interconnected but with an optical discontinuity between the optical surfaces. For example, the stack of secondary mirrors can be embodied as a monolithic element with stepped reflective surfaces (not shown).

In some embodiments, the combination of a concave primary mirror and concave secondary mirror may form a so-called Gregorian telescope. In the current design it is preferred to use separate imaging branches for each of the multiple entry angles α$i$. For example, each imaging branch can have a distinct (off-axis) Gregorian telescope design. Alternatively, the combination of a concave primary mirror and convex secondary mirror may form a so-called Cassegrain telescope. In the current design it is preferred to use separate imaging branches for each of the multiple entry angles α$i$. For example, each imaging branch can have a distinct off-axis Cassegrain telescope design. Of course the same optical functionality as described herein can also be provided by more than two optical elements per imaging branch, e.g. three, or more mirrors, though at the cost of extra weight. Also other combinations of convex/concave elements can be used to provide similar optical results. Alternative, or in addition to mirrors, also lenses can be used. While the current embodiment shows five imaging branches, there can also be more or less, e.g. two, three, four, five, six, seven, eight, nine, or more.

Figure 3:
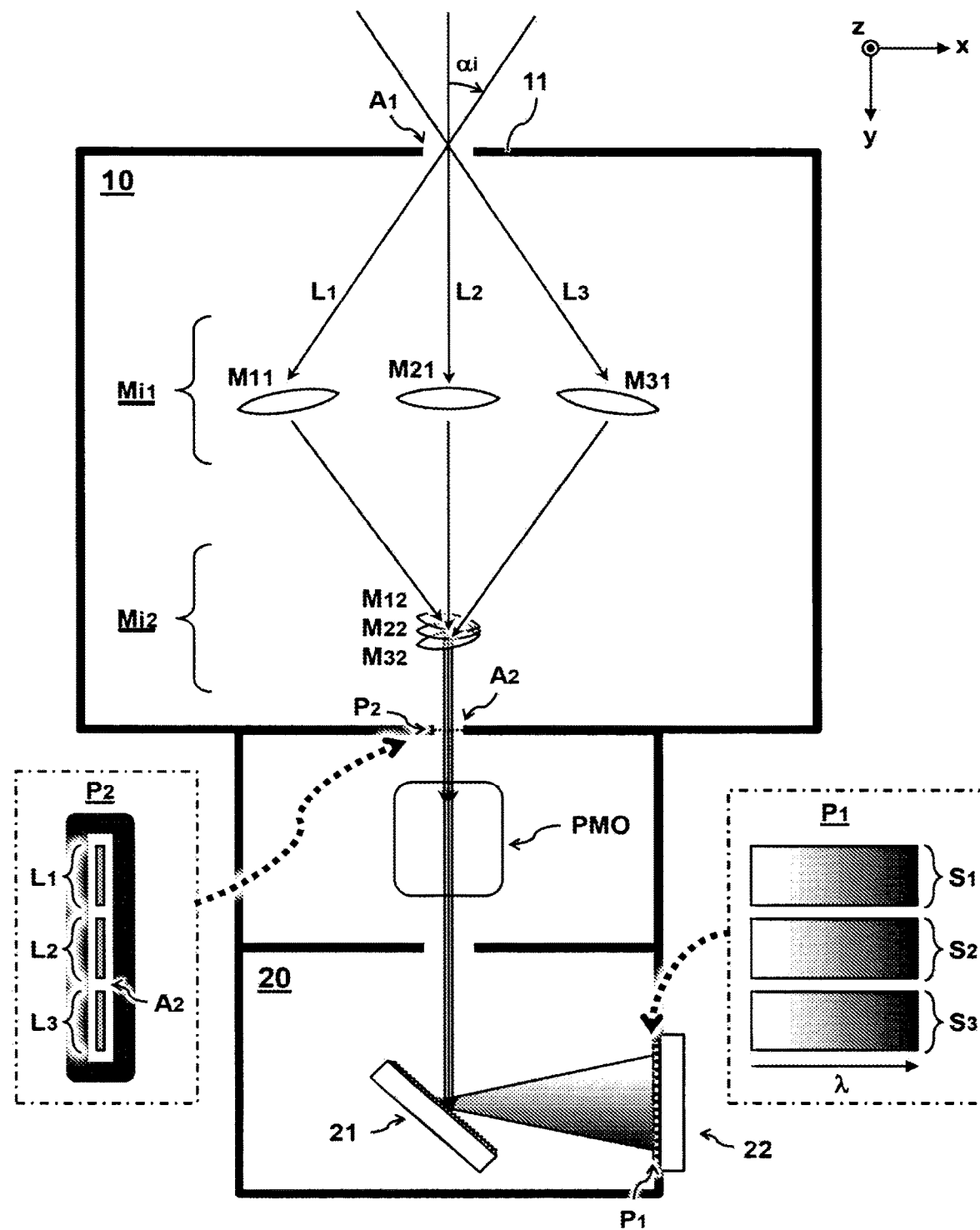
FIG. 3 schematically illustrates another embodiment of a multi-angle imager combined with polarization modulation optics and a spectrometer.

FIG. 3 schematically illustrates another embodiment of a multi-angle imager 10.

In some embodiments, the optical elements M11, M12 in each imaging branch M1$j$ are configured to focus their respective light beam L1 onto a slit A2. In other or further embodiments, the multiple imaging branches M1$j$, M2$j$ are configured to project respective images of the respective subsections S1, S2 onto a slit A2. In one embodiment, the images are extended along a length direction "z" of the slit A2 to provide spatial information of the respective subsections S1, S2 at least along said length direction "z", while the width direction "x" of the slit A2 can be used for e.g. subsequent spectral and/or polarization analysis. In some embodiments, the subsections S1, S2 of the object P0 to be imaged have a length that is greater than their width by at least a factor two, three, five, or more, e.g. a factor ten. In some embodiments (not shown), the system can be modified by adding (folding) mirrors, e.g. at the position currently indicated A2 to relocate the aperture, slit or lens set. Possibly, this may further compactify the system. In some embodiment there is no slit but only an image plane, i.e. the subsections S1, S2 are imaged with their length along the x-direction and width along the z-direction (x=swath, z=viewing angle).

In some embodiments, as shown, the imager 10 is combined with polarization modulation optics PMO to form a multi-angle spectropolarimeter. In some embodiments, the spectropolarimeter comprises a single integrated polarization modulator optics (PMO), preferably disposed in a plurality of light beams Li after the imaging array M$ij$. In some embodiments, the light beams can be stacked parallel and imaged at the slit A2. In a preferred embodiment, the PMO is disposed near the slit A2, e.g. directly adjacent the slit either before or behind the slit. Preferably, the PMO is an integrated device e.g. according to the article by Rietjens et al discussed in the background section. For example, the polarization modulator optics PMO comprises an athermal multiple-order retarder, e.g. MgF2+sapphire crystals, a polarizing beam splitter, e.g. Wollaston prism. and an achromatic quarter-wave retarder, e.g. Fresnel rhomb. Also possible are embodiments with other polarization modulation optics in combination with an imager (e.g. photo-elastic modulation) or embodiments with (polarizing) beam splitters in combination with a (spectral) imager. E.g. a spectral imager comprising stripe bandpass and/or polarization filters on the detector could be used in combination with a multi-angle telescope.

In some embodiments, as shown, the imager 10 is combined with a single spectral dissolving element 21 and/or imaging sensor 22 to form a multi-angle spectrometer 20. Preferably the multi-angle spectrometer 20 has as a single grating or prism configured to resolve the plurality of light beams Li traveling in parallel and/or having common degree of collimation. In some embodiments, the spectrally resolved light beams Li are imaged onto a single detector surface, e.g. pixel array. While not all depicted in the schematic figure, typically a spectrometer comprises the following elements: collimator, spectrally dissolving element, objective; these are typically followed by a single detector surface, e.g. pixel array.

Figure 4A:
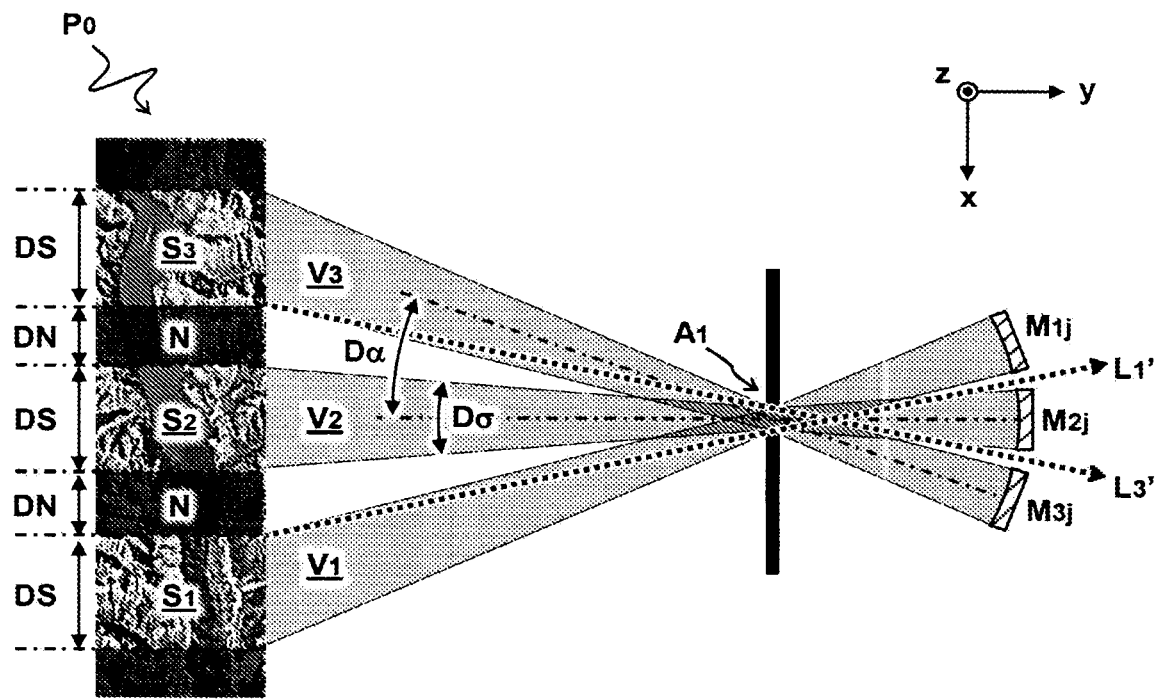
FIGS. 4A and 4B schematically illustrate the effect of separating adjacent fields of view.
Figure 4B:
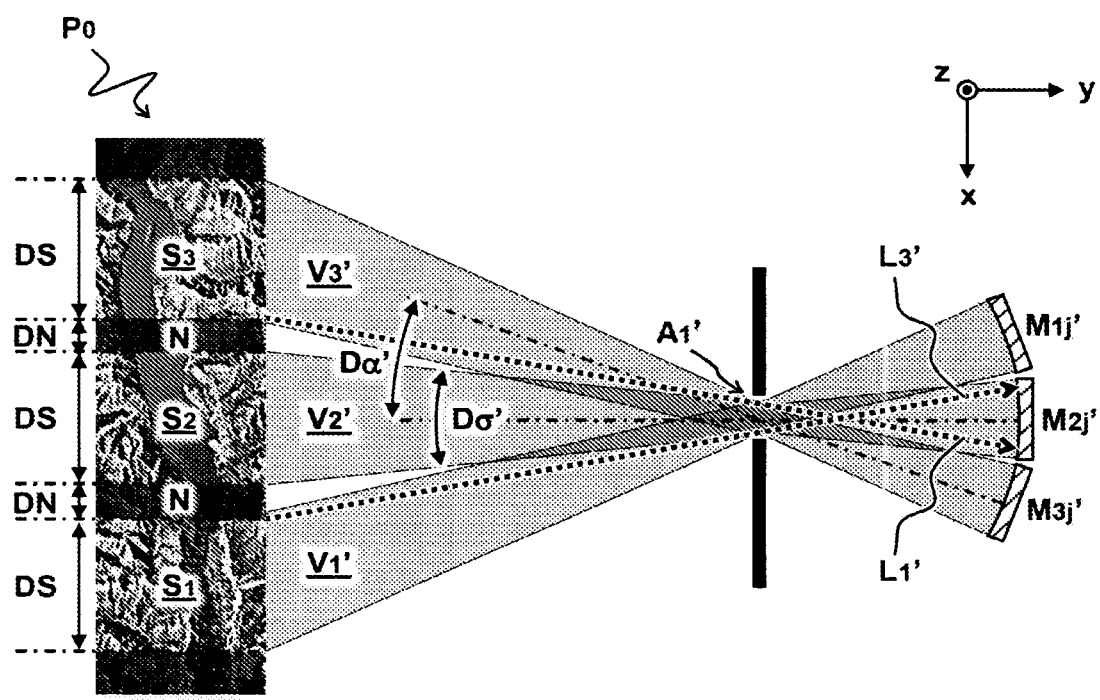

FIGS. 4A and 4B schematically illustrate the effect of separating adjacent fields of view V1, V2, V3.

As shown, each imaging branch M1$j$ together with the respective entrance pupil A1 may define a respective field of view V1. For example, the fields of view V1, V2, V3 can be characterized by the respective spatial extent DS of the imaged subsection S1, S2, S3 on the object P0. Alternatively, or in addition, the field of view V1 can be characterized by the maximum opening angle Dσ of the respective light beam that can enter the entrance pupils A1 and be imaged by the respective imaging branch M1$j$. The opening angle of a field of view can also be referred to as the angle of view. For example, the field of view V1 may be determined by a spatial extent of the entrance pupil A1, a spatial extend of a field-limiting aperture at an intermediate position, the primary or further imaging mirrors, and their relative positions. For example, the field of view can be determined by ray tracing an optical design, e.g. determining the limits of rays that can be projected onto the detector via the imaging array back from the entrance pupil.

In a preferred embodiment, the object P0 is not imaged before entering the imaging array M$ij$. For example, the object P0 need not be imaged at the entrance pupils A1. In other words, the imaging array M$ij$ may have a single object plane namely at the distance of the object P0 to be imaged. Because the present design does not need to rely on an intermediate object plane, an additional projection system in front of the entrance pupil A1 can be omitted which saves excess weight. However, it should preferably be prevented that the light from adjacent fields of view gets mixed up, ending in the wrong detection channel. In this regard it is advantageous that the fields of view in a multi-angle imager 10 are typically separate.

For example, in FIG. 4B the fields of view are less separated than in FIG. 4A. As illustrated in FIG. 4B, the lack of sufficient separation may cause stray light rays L1', L3' from the adjacent sections S1, S3 to enter the wrong imaging branch M2j', which is prevented in FIG. 4A where the light rays L1', L3' cannot directly hit imaging branch M2j'.

Therefore it is preferred in some embodiments that adjacent fields of view V1, V2 or V2, V3 are separated by non-imaged parts N of the object P0 there between. For example, an angular separation Dα between center lines of adjacent fields of views V2, V3 is higher than an (average) opening angle Dσ of said adjacent fields of views V2, V3, e.g. higher by more than one percent, ten percent, twenty percent, fifty percent, or even more than a factor two, five, ten, or more e.g. a factor hundred. The higher the angular separation Dα compared to the opening angle Dσ, the less stray light of one field of view may bleed into an adjacent field of view.

Alternatively, or in addition, it is preferred in some embodiments that adjacent subsections S1, S2 of the object P0 to be imaged are spaced apart by non-imaged sections N of the object P0. Preferably, a spatial extent DN of the non-imaged sections N between adjacent imaged subsections S1, S2 of the object P0 s more than one percent of a spatial extent DS said adjacent imaged subsections S1, S2, preferably more than ten percent, twenty percent, fifty percent, or even more than a factor two, five, ten, or more e.g. a factor hundred. The higher the spatial separation DN between the adjacent imaged subsections S1, S2, the less stray light of one imaged subsection S1 may bleed into the image of an adjacent subsection S2.

Preferably, the spatial or angular separation between adjacent views is sufficient to prevent light from one imaged subjection to end up in the image of an adjacent subsection, e.g. wherein at least ninety percent of the light in an image actually originates from the respective subsection, preferably more than ninety-nine percent, more than 99.9%, or practically all of the registered light. Preferably, the entrance pupil A1 is sufficiently wide to prevent bending of the entering light beams. For example, the spatial extent of the pupil is preferably higher than a coherence length of the light, e.g. by a factor of two, five, ten, hundred, or more, so that the light generally travels in a straight line through the entrance pupil A1 and is minimally affected by diffraction effects.

In some embodiments, the imager 10 is integrated in a satellite 100, e.g. as shown in FIG. 1A, or other orbiting or in-situ platform. For example, the object P0 to be imaged is a planet surface or atmosphere. For example, the satellite 100 may typically operate at a distance of a few hundred kilometers or more from the planet surface. For example, the subsections Si to be imaged comprise rectangular swaths of the planet having typical dimensions of about ten by hundred kilometer. Of course also other dimensions are possible. Typical viewing angles αi may be for example, angles of 0, ±14, ±28, ±42, and ±56 degrees; or 0,±20,±50; or 0,±35,±50. Of course also other angles are possible.

For the purpose of clarity and a concise description, features are described herein as part of the same or separate embodiments, however, it will be appreciated that the scope of the invention may include embodiments having combinations of all or some of the features described. Various aspects as described herein can also be embodied as a method to simultaneously image different subsections of an object with the multi-angle imager. Some embodiments light beams of an object to be imaged are passed from multiple entry angles αi through one or more entrance pupils into the imager. Some embodiments comprise receiving the light beams via the one or more entrance pupils according to distinct fields of view of the object along each of the multiple entry angles onto an imaging array. Some embodiments comprise imaging the subsections Si of the object P according to the distinct fields of view Vi onto an imaging plane P1.

While embodiments were shown for particular optical arrangements, also alternative ways may be envisaged by those skilled in the art having the benefit of the present disclosure for achieving a similar function and result. E.g. optical elements such as mirrors or gratings may be combined split up, or replaced by one or more alternative components such as lenses and/or prisms. The various elements of the embodiments as discussed and shown offer certain advantages, such as reduction of weight and improving compactness/robustness. Of course, it is to be appreciated that any one of the above embodiments or processes may be combined with one or more other embodiments or processes to provide even further improvements in finding and matching designs and advantages.

It is appreciated that this disclosure offers particular advantages to the deployment of a multi-angle imager in a satellite or airplane, and in general can be applied for any application of a light weight multi-angle imager, optionally combined with an imaging sensor, spectroscope, polarimeter, et cetera. For example, some aspects as described herein may be applicable for e.g. fast temporal modulation using photo-elastic modulators. Some aspects may also be used to form a multi-angle polarimeter in which the polarimetry is performed using temporal modulation (filter wheel) or amplitude splitting. It allows for higher spatial resolution with wide field-of-view imagers, allows for optimizing the spatial resolution and swath over the viewing angle range beyond a f-tan(theta) mapping while maintaining a single detector for imaging the set of distinct subsections of an object. It is also a solution that benefits from the small exposure to space via small entrance apertures, in contrast to the lens-based designs.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A multi-angle imager comprising
one or more entrance pupils configured to pass through light beams of an object to be imaged from multiple entry angles into the imager;
an imaging array configured to
receive the light beams via the one or more entrance pupils according to distinct fields of view of the object along each of the multiple entry angles, and image subsections of the object according to the distinct fields of view onto an imaging plane;

wherein the imaging array comprises multiple imaging branches configured to form respective optical paths for the light beams through the imager for imaging the respective subsections of the object;

wherein each imaging branch comprises a distinct set of optical elements configured to
receive the respective light beam along the respective entry angle and
redirect the respective light beam towards the imaging plane;

wherein the light beams from each of the multiple imaging branches are redirected to travel in a common direction between the imaging array and the imaging plane;

wherein the multiple imaging branches are configured to stack their respective light beams one above the other along a direction transverse to a plane spanned by the multiple entry angles.

2. The multi-angle imager according to claim 1, wherein the redirected light beams travel along substantially parallel paths in the common direction.

3. The multi-angle imager according to claim 1, wherein the imaging array is configured to combine the incoming light beams to have a common effective focal plane.

4. The multi-angle imager according to claim 1, wherein the light beams from each of the multiple imaging branches are stacked in a row along a direction transverse to their direction of travel.

5. The multi-angle imager according to claim 1, wherein the multiple imaging branches are configured to project respective images of the respective subsections onto a slit, wherein the images are extended along a length direction of the slit to provide spatial information of the respective subsections along said length direction, wherein the images projected in a width direction of the slit for subsequent spectral analysis.

6. The multi-angle imager according to claim 1, wherein the object is not imaged before entering the imaging array.

7. The multi-angle imager according to claim 1, wherein adjacent fields of view are separated by non-imaged parts of the object there between, wherein the spatial or angular separation between adjacent views is sufficient to prevent light from one imaged subjection to end up in the image of an adjacent subsection.

8. The multi-angle imager according to claim 1, wherein each imaging branch has its own set of at least two optical elements distinct from any other imaging branch.

9. The multi-angle imager according to claim 1, wherein corresponding optical elements of different imaging branches are separate from each other, wherein each optical surface provides a distinct optical function.

10. The multi-angle imager according to claim 1, wherein
the distinct set of optical elements in each imaging branch has at least a distinct primary mirror, wherein the primary mirrors in different branches are distributed to receive the light beams from the one or more entrance pupils at a range of multiple entry angles;
the distinct set of optical elements in each imaging branch has at least a distinct secondary mirror, wherein the secondary mirrors in different branches are stacked in a row to receive the light beams reflected from the primary mirrors and reflect parallel light beams in a common direction;
wherein the directions of the at least primary and secondary mirrors of each of the imaging branches are distinctly oriented to provide a common direction of the light beams exiting the imaging array; and
wherein the at least primary and secondary mirrors of each of the imaging branches are distinctly curved to provide a common focal length between the imaging branches.

11. A multi-angle spectropolarimeter comprising
one or more entrance pupils configured to pass through light beams of an object to be imaged from multiple entry angles into the spectropolarimeter;
an imaging array configured to
receive the light beams via the one or more entrance pupils according to distinct fields of view of the object along each of the multiple entry angles, and
image subsections of the object according to the distinct fields of view onto an imaging plane;
wherein the imaging array comprises multiple imaging branches configured to form respective optical paths for the light beams through the spectropolarimeter for imaging the respective subsections of the object;
wherein each imaging branch comprises a distinct set of optical elements configured to
receive the respective light beam along the respective entry angle and
redirect the respective light beam towards the imaging plane;
wherein the light beams from each of the multiple imaging branches are redirected to travel in a common direction between the imaging array and the imaging plane, and
wherein a single integrated polarization modulator optics is disposed in a plurality of light beams travelling in a common direction after the imaging array.

12. The multi-angle spectropolarimeter according to claim 11, forming a multi-angle spectrometer, wherein a single spectral dissolving element is configured to resolve the plurality of light beams, wherein the spectrally resolved light beams are imaged onto a pixel array.

13. The multi-angle spectropolarimeter according to claim 11, disposed on board of a satellite, wherein the object to be imaged is a planet surface or atmosphere.

14. A multi-angle imager comprising
one or more entrance pupils configured to pass through light beams of an object to be imaged from multiple entry angles into the imager;
an imaging array configured to
receive the light beams via the one or more entrance pupils according to distinct fields of view of the object along each of the multiple entry angles, and
image subsections of the object according to the distinct fields of view onto a first imaging plane;
wherein the imaging array comprises multiple imaging branches configured to form respective optical paths for the light beams through the imager for imaging the respective subsections of the object;
wherein each imaging branch comprises a distinct set of optical elements configured to
receive the respective light beam along the respective entry angle and
redirect the respective light beam towards the first imaging plane;
wherein the light beams from each of the multiple imaging branches are redirected to travel in a common direction between the imaging array and the first imaging plane; and
wherein the object is not imaged before the first imaging plane.

15. The multi-angle imager according to claim 14, wherein the first imaging plane coincides with a slit.

16. The multi-angle imager according to claim 15, wherein the multiple imaging branches are configured to project respective images of the respective subsections onto the slit, wherein the images are extended along a length direction of the slit to provide spatial information of the respective subsections along said length direction, wherein the images projected in a width direction of the slit for subsequent spectral analysis.

17. The multi-angle imager according to claim 16, further comprising a spectrometer configured to project a spectrally resolved image of the slit onto an imaging sensor.

18. The multi-angle imager according to claim 14, wherein each imaging branch between the one or more entrance pupils and the first imaging plane has an exclusive set of optical elements distinct from any other imaging branch.

19. The multi-angle imager according to claim 14, wherein a single integrated polarization modulator optics is disposed in a plurality of light beams travelling in a common direction after the imaging array.

20. The multi-angle imager according to claim 14, wherein the multiple imaging branches are configured to stack their respective light beams one above the other along a direction transverse to a plane spanned by the multiple entry angles.

* * * * *